United States Patent [19]

Youssef

[11] 3,870,600

[45] Mar. 11, 1975

[54] SELECTIVE AND ENRICHMENT MEDIUM FOR THE ISOLATION IDENTIFICATION AND PROPAGATION OF YEASTS AND FUNGI

[76] Inventor: Kamal Abdou Youssef, 233 74th St., Brooklyn, N.Y. 11209

[22] Filed: June 25, 1973

[21] Appl. No.: 373,185

Related U.S. Application Data

[63] Continuation of Ser. No. 129.256, March 29, 1971, abandoned.

[52] U.S. Cl. .................... 195/81, 195/82, 195/100, 195/103.5
[51] Int. Cl. .......................... C12b 1/00, C12k 1/06
[58] Field of Search ........ 195/100, 101, 102, 103.5, 195/81, 82

[56] References Cited
UNITED STATES PATENTS 3,502,546   3/1970   Thompson et al. ................. 195/100

OTHER PUBLICATIONS

The Merck Index, Eighth Edition, p. 217, (1968).

Biochem. Journal, pp. 528–533, Vol. 43, (1948).

*Primary Examiner*—Alvin E. Tanenholtz
*Attorney, Agent, or Firm*—Thomas B. Graham

[57] ABSTRACT

A selective enrichment nutrient medium for the isolation, identification and propagation of yeasts and fungi containing a fruit pulp, or quinone derivative/s, source of nitrogen, minerals and sugar, where the resulting nutrient medium is useful for the preferential cultivation of molds, yeasts and fungi in the presence of bacteria which will not propagate in the medium.

2 Claims, No Drawings

SELECTIVE AND ENRICHMENT MEDIUM FOR THE ISOLATION IDENTIFICATION AND PROPAGATION OF YEASTS AND FUNGI

RELATED APPLICATIONS

This application is a continuation of my copending application Ser. No. 129,256, filed Mar. 29, 1971 and now abandoned.

DETAILED DESCRIPTION OF THE INVENTION:

The invention is in a new selective and enrichment composition for the isolation, identification and propagation of yeasts and fungi for different purposes, e.g. medical and industrial, based on its containing a fruit pulp, or quinone derivative/s, source/s of nitrogen, minerals and sugar/s.

In growing fungi from clinical samples, and samples in which numerous or certain strains of bacteria are present, on various media there often result difficulties, since the fungus cultures may be overgrown by the accompanying bacteria and/or other microorganisms. The composition according to this invention is for inhibiting the growth of bacteria and microorganisms other than yeasts and fungi and allowing good rapid growth (often characteristic of the latter and is characterized by its containing — among a few other constituents — quinones and quinone derivative/s. It also concerns the use of the new composition in culture media for growing yeasts and fungi including pathogenic varieties (human disease producing, animal and plant disease producing). It has proved to be particularly valuable to use as additional substance to conventional culture media, an aqueous extract of the dry pulp of the ripe fruits of the flowering tree Cassia fistula (commonly known as the "golden-shower" tree which is indigenous to India but is cultivated in many other warm climates in Africa (e.g. Egypt), Central and South America and the Antilles islands and even in Central and South Florida. It is often found in gardens and parks in these areas for its beautiful golden yellow scented flowers arranged in grape-like clusters and evergreen large tree. The quinone derivatives, however, are not uniquely present in the pulp of these fruits as they have been isolated from many other biological sources, such as plants and fungi as well as having been synthetically prepared. It is interesting to note that more than 30 percent of the dry weight of the mycelia of certain fungi (certain helminthosporium species) belong to the quinone class of compounds. The same group of substances were also isolated from the leaves of Cassia angustifolia, Aloes and Jalap (what is commonly known as drastic purgatives) and are actually included in the pharmacoepias under purgatives although the pulp of Cassia fistula fruits is considered a milder purgative than Aloes and Jalap. The substances are also present in the fruits of Cassia grandi cultivated in Brazil. There are biological sources other than those mentioned as well as various synthetic methods for preparation of the different quinones. The plant extract has been found to inhibit the growth of gram positive bacteria and to a lesser extent gram negative bacteria as well. By microscopic examination, it will often be found that the microbes belonging to both classes stop multiplication and give rise to "Bizzare", "Serpentine", "Giant" forms . . . etc. depending on the species and concentration of the active substance/s. Some of the cells apparently continue to grow but are unable to divide. This may explain the abnormally long forms encountered with Escherichia coli for example. This antibacterial effect can be demonstrated in fluid as well as in solid media. The quinone derivative which is present in the fruit pulp of Cassia fistula according to F. K. Modi and M. L. Khorana, Indian J. Pharm. 14,61–3,66(1952) is 1,8 dihydroxy-3-anthraquinone-carboxylic acid, M.P. 313°–16°C. (decomposition) and an anthraquinone derivative M.P. about 250°C. The aqueous extract may be added to the desired culture medium whether fluid or solid medium.

Some of the advantages of the new culture medium:

1. No pH adjustment or autoclaving is required.
2. The growth of fungi sharply contrasts with the deep colour of the medium, allowing early and easy detection of the growth.
3. Selective isolation of fungi and yeasts (bacteria and actinomycetes are inhibited as previously explained).
4. This helps in identification as it assures that the growth obtained belongs to fungi or yeasts. In addition, colonies of the medically important Candida albicans selectively develop a characteristic bright golden colour which vividly contrasts with the deep red-brown colour of the medium in addition to the development of the diagnostic macroconidia (chlamydospores) if the grown culture is left for 1-2 days at room temperature (22°–28°C.). This surely helps in the identification. Colonies of Saccharomyces cervicae, for example, develop a distinct chocolate brown color on this medium. Although Candida tropicalis may develop a color similar to that of C. albicans yet the colonies are more flat (no doming) and with the development of hairs at the edge of the former colonies if the grown culture is left at room temperature (22°–28°C). for 1-2 days. This will easily differentiate between the two. There are differences in the color and colonial morphology between Candida albicans and the other Candida species — in addition to chlamydospore formation which would mean more rapid diagnosis for Candidiasis and there would be no need for a time consuming additional culture for chlamydospores. Hansenula anomala develops a white wrinkled growth on the medium which makes its identification very easy.
5. Growth stimulation of many fungi, e.g. Aspergillus niger.
6. Increase in the yield of important biological products of certain fungi e.g. citric acid by Aspergillus niger.
7. It may stimulate the production of antibiotic/s by fungi that do not otherwise produce antibiotics.
8. On the medium (chlamydospore formula) there is more rapid production of the diagnostic chlamydospores.

EXAMPLES OF DIFFERENT FORMULAE
MYCOGEL GP (MYCOGEL, nutrient medium per this invention, for general purposes)

Into a conical or boiling flask with flat bottom weigh 3 grams of the dry pulp (the more of the pulp is used, the more the antibacterial property of the medium will be) of the ripe fruits of Cassia fistula. Measure 100 milliliters of distilled water and add it to the pulp. Autoclave at 15 pounds pressure for 15–20 minutes and then filter through gauze and restore to 100 milliliters by letting an amount of distilled water equivalent to the amount evaporated to pass through the same gauze. To the filtrate add half a gram of peptone e.g. bactopeptone or 0.3 gram of sodium nitrate, 0.3 gram of beef extract, 3-4 gram dextrose and agar agar (powder or shreds) 2 grams. The ingredients are allowed to dissolve completely, while heating the mixture by immersion of the flask in a boiling water bath for about 20 minutes or by steaming in the autoclave (steam not under pressure) for a sufficient period of time for the agar to melt completely. The contents are then steamed for 20-30 minutes and then dispensed in sterile tubes (preferably screw capped type) or Petri-dishes as desired and allowed to solidify in case of agar addition. (Sterilization can be also made following dispensing in autoclave-resistant tubes). Before and following inoculation of the medium, the surface of the medium should be dried, if wet, in the incubator. Incubation is carried out at 37°C. (for yeasts and/or yeast phase of fungi) and/or 28°C. for fungi or for the development of fungal phase or morphology (e.g. *Candida tropicalis* hairs) and/or chlamydospores of *Candida albicans*, or as required. The results are usually read in 1, 2, 3 and more days if necessary. The colonies of *Candida albicans* start growing as minute characteristically dome shaped colonies often dark in color but as soon as they grow bigger (48 hours), they rapidly acquire a characteristic bright golden yellow color, semi-glossy and with a progressively less curved surface (getting more and more flat). Colonies belonging to Candida other than *Candida albicans* grow in a different manner: usually slower (*Candida tropicalis*, however, grows as fast and even faster) with little or no doming (*Candida parapsilosis* which is closely related to *C. albicans* and has been isolated from heart affections (endocarditis) may develop a domeshaped appearance although to a less extent). *Cryptococcus neoformans* which is also pathogenic and of medical importance grows more slowly than *C. albicans* and acquires a light gray or yellow coloration and with characteristic doming and rich creamy growth, more glossy than *C. albicans*, may resemble the mucoid or viscous appearance of *Aerobacter*, *Klebsiella* or *Leuconostoc* mesenteroides on sugar media due to the development of a muco-polysaccharide around the colonies and may explain also why cultures of *Cryptococcus neoformans* are so easily washed away from the agar by sterile saline or distilled water. The formula is recommended, therefore, whenever *Candida albicans* is suspected and as a matter of fact should be used routinely in cases of leucorrhoea, vaginal itching, infections around the nails, intestinal infections, diarrhoea specially following broad spectrum antibiotic therapy, in infants and debilitated individuals in general, thrush in infants and debilitated individuals, diabetics (urine and other suspicious secretions and excretions and localities); also sputum in respiratory infections to avoid delay in diagnosis or missing it altogether and C.S.F. A luxuriant easily distinguished growth of *Candida albicans* or *Cryptococcus neoformans* (depending on the case) is obtained. MYCOGEL GP can be successfully used for the propagation of the vast majority of fungi and yeasts, particularly in their isolation from any sample containing bacteria, as previously explained, with distinct superiority over other media. No pH adjustment is required for Monilia cultures, *Cryptococcus neoformans*, saprophytic fungi or pathogenic fungi of plant origin (Phyto-Fungi) or from soil samples. The pH of the medium is usually 5.5. For the isolation of *Candida albicans* MYCOGEL GP with or without chloramphenicol can be used. On MYCOGEL GP some of the dermatophytes, e.g. Trichophyton species, however, may be overgrown by saprophytic fungi, therefore, MYCOGEL D is recommended for the isolation of dermatophytes (with the addition of Cycloheximide "Actidione" to the medium). For the propagation of pure cultures, the addition of antibiotics is not required.

Formula II: MYCOGEL GP with Chloramphenicol

For material teeming with gram negative and resistent bacilli (e.g. stools), it may be necessary to add chloramphenicol (4-5 micrograms per ml. of medium), otherwise, greater concentration of the plant or quinone additive has to be used which may inhibit certain fungal elements. Chloramphenicol need not be sterile if added before steaming or even autoclaving (as it is "autoclave-resistent") of the medium. The addition of chloramphenicol greatly enhances the antibacterial effect of the medium, but it should be remembered, however, that certain fungi e.g. *Allescheria boydii* and certain *Aspergillus* species are inhibited by chloramphenicol.

Formula III: MYCOGEL D

MYCOGEL D is used for the isolation of dermatophytes. The pH of the medium, however, must be adjusted to 7-8. Cycloheximide (1 gram per liter is added). It should be remembered, however, that *Cryptococcus neoformans* is inhibited by Cycloheximide.

Formula IV: MYCOGEL D with Chloramphenicol

Chloramphenicol (4-5 micrograms per ml. of medium) may be added to MYCOGEL D to enhance the antibacterial effect of the medium and thus allow the isolation of many fungal elements and yeasts from materials moderately to heavily contaminated with bacteria. The composition and preparation of MYCOGEL D is the same as MYCOGEL GP except for pH adjustment and peptone may be increased to 1%.

Formula V: MYCOGEL CD (with and without agar and with or without Chloramphenicol)

This is essentially a modified Czapek Dox medium and has the following composition:

| | |
|---|---|
| Dextrose | 3 gram |
| 3% autoclaved aqueous extract of the dry pulp of *C. fistula* | 100 milliliters |
| Ferrous sulfate (7 H$_2$O) | 1 milligram |
| Magnesium sulfate (anyhdrous) | 50 milligrams |
| Potassim chloride | 50 milligrams |
| Dipotassium phosphate | 100 milligrams |
| Sodium nitrate | 300 milligrams |
| Agar Agar (if any) | 2 grams |

The medium will be used for the same purposes of Czapek Dox with the added advantage of having more antibacterial effect and possible color reaction with yeasts. It is therefore of value for cultivation and identification of saprophytic fungi and other microorganisms. It may be also used for mildew resistance tests, morphological and other studies.

Formula VI: MYCOGEL F

Some fungi and yeasts or yeast phases of certain fungi e.g. *Blastomyces dermatitidis* and *Histoplasma capsulatum* may require the addition of a more rich nitrogen and amino acid source/s and/or complex additives e.g. serum or blood to the medium. In this case MYCO- GEL F (with or without chloramphenicol) may be used. The formula is:

| | | |
|---|---|---|
| 3 percent extract of the pulp | 100 | milliliters |
| Dextrose | 3 | grams |
| Sodium chloride | 0.75 | grams |
| Pancreatic digest of casein | 1.5 | grams |
| Peptone | 0.5 | grams |
| Cystine | 0.03 | grams |
| Agar agar (if any) | 2 | grams |

For further enrichment 5–10 percent defibrinated sheep or rabbit blood or serum may be added.

Alternatively MYCOGEL F (Brain Heart infusion formula) may be used:

| | | |
|---|---|---|
| Calf brain, infusion from | 200 | grams |
| Beef heart, infusion from | 250 | grams |
| Peptone | 10 | grams |
| Sodium chloride | 5 | grams |
| Disodium phosphate | 2.5 | grams |
| Dextrose | 30 | grams |
| 3% aqueous heated pulp extract | 1000 | milliliters |
| Agar agar (if any) | 20 | grams |

Chloramphenicol may be added (4–5 micrograms/milliliter). For further enrichment 5–10% defibrinated sheep or rabbit blood or serum may be added. The advantages of the medium would be more antibacterial effect and colour reaction with yeasts.

Formula 7: MYCOGEL (C) (Chlamydospore formula)

If the quinone content of the medium is increased to 0.2 gram/100 milliliters of medium or more, the antibacterial property of the medium becomes pronounced and *Candida albicans* produces its diagnostic chlamydospores in 1–2 days only, even at 37°C. instead of 3–4 days on corn meal medium at room temperature. This means more rapid diagnosis in case there is any doubt as to the identity of the yeast isolated.

Nature of the different culture medium constitutents:

Nitrogen source: as already mentioned the nitrogen source is variable e.g. peptone, pancreatic digest of casein, cystine, sodium nitrate, ammonium nitrate and/or other sources (e.g. blood)

Sugar: usually dextrose is used but other sugars may be used as well e.g. sucrose.

Quinones: There are several of these derived from plants.

The following examples of quinone derivatives have been isolated from fungi.

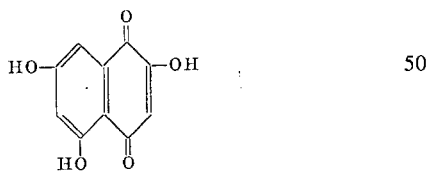

Flaviolin
*Aspergillus citricus*
(Davies *et al.*, 1955)

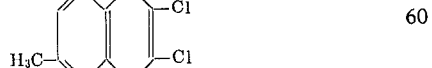

Mollisin
*Mollisia caesia*
(Van der Kerk and Overeem, 1957)

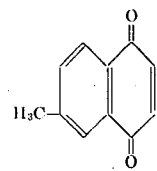

6-Methyl-1,4-naphthoquinone
*Marasmius gramineum*
(Bendz, 1948)

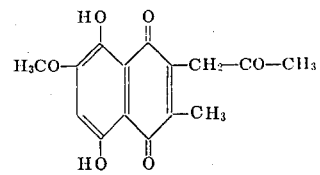

Javanicin
*Fusarium javanicum*
(Arnstein and Cook, 1947;
Ruelius and Gauhe, 1950)

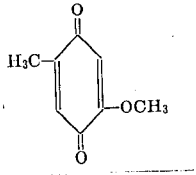

2-Methoxy-5-methylbenzoquinone
*Coprinus similis*
(Anchel *et al.*, 1948)

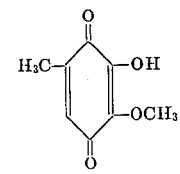

Fumigatin
*Aspergillus fumigatus*
(Anslow and Raistrick, 1938;
Baker and Raistrick, 1941)

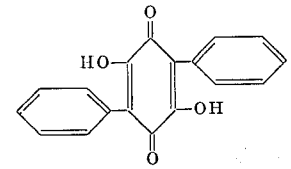

Polyporic acid
*Polyporus nidulans*
(Kögl, 1926)

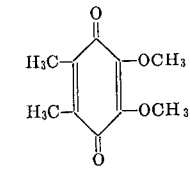

Aurantiogliocladin
*Gliocladium sp.*
(Vischer, 1953)

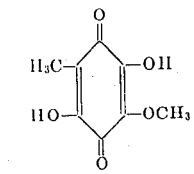

Spinulosin
*Penicillium spinulosum*
(Birkinshaw and Raistrick, 1931)

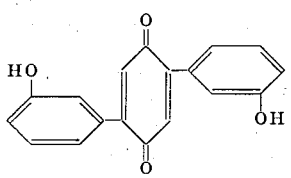

Volucrisporin
*Volucrispora aurantiaca*
(Divokar et al., 1959)

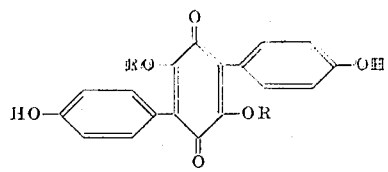

Atromentin; R=H
*Polyporus nidulans*
(Kögi and Becker, 1928)

Aurantiacin; R=C₆H₅CO
*Hydnum aurantiacum*
(Gripenberg, 1956)

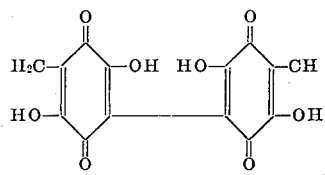

Oosporein
*Oospora colorans*
(Kögl and van Wessem, 1944)

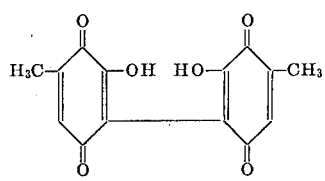

Phoenicin
*Penicillium phoenicium*
(Posternak, 1938)

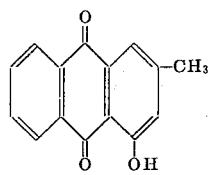

Pachybasin
*Pachybasium candidum*
(Shibata and Takido, 1955)

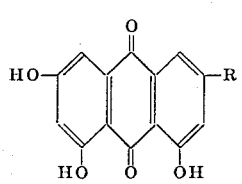

Emodin; R=CH₃
*Cortinarius sanguincus*
(Kögl and Postowsky, 1925)

ω-Hydroxyemodin; R=CH₂OH

Emodic acid; R=CO₂H
*Penicillium cyclopium*.
(Anslow et al., 1940)

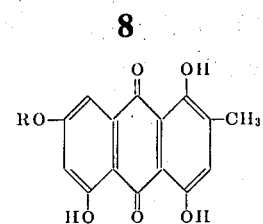

Catenarin; R=H
*Helminthosporium calenarium*
(Anslow and Raistrick, 1940)

Erythroglaucin; R=CH₃
*Aspergillus glaucus*
(Ashley et al., 1939)

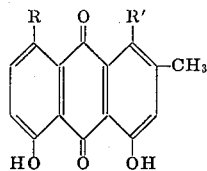

Chrysophanol; R=R'=H
Islandicin; R=H, R'=OH
*Penicillium islandicum*
(Howard and Raistrick, 1949, 1950)

Helminthosporin; R=OH, R'=H
*Helminthosporium gramineum*
(Charles et al., 1933)

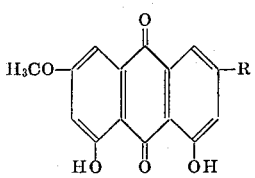

Physcion; R=CH₃
*Aspergillus glaucus*
(Ashley et al., 1939)

Teloschistin; R=CH₂OH
*Teloschistes flavicans*
(Seshadri and Subramanian, 1949)

Fallacinal; R=CHO
*Xanthoria fallax*
(Murakami, 1956)

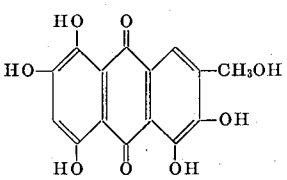

Asperthecin
*Aspergillus quadrilineatus*
(Howard and Raistrick, 1955;
Birkinshaw and Gourlay, 1961)

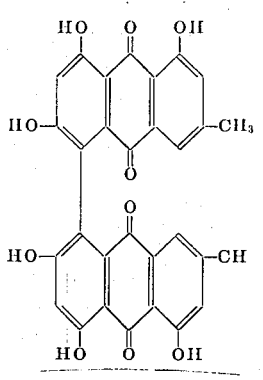

Skyrin
*Penicillium islandicum*, etc.
(Shibata et al., 1955)

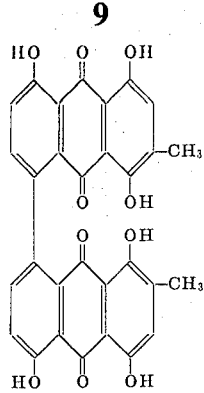

Iridoskyrin
*P. islandicum*
(Howard and Raistrick, 1954)

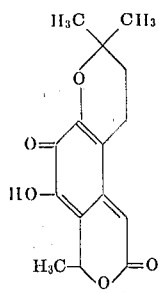

Fuscin
*Oidiodendron fuscum*
(Michael, 1948; Barton and Hendrickson, 1955)

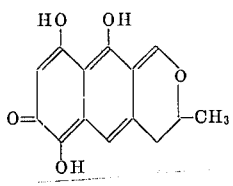

Purpurogenone
*Penicillium purpurogemon*
(Roberts and Warren, 1955)

For the detailed references see: "The Fungi" (1965) (second printing 1967) by G. C. Ainsworth and Alfred S. Sussman, Vol. I, pages 222–228 (published by Academic Press Inc., 111 Fifth Avenue, New York, N.Y. 10003):

All these quinone derivatives — whether of plant, fungal or synthetic origin — are useful in any MYCOGEL formulation of nutrient medium. Work reported herein was done with quinone derivatives present in the pulp of the ripe fruits of *Cassia fistula* obtained from Egypt. The structural formula is already mentioned to be: 1,8,dihydroxy-anthraquinone-3-carboxylic acid and an unidentified anthraquinone substance with a melting point 250°C.

The Benzoate Sensitivity Test

*Candida albicans* and *Cryptococcus neoformans* were found sensitive to benzoic acid and its salts and benzoyl compounds (e.g. sodium salt). *Candida tropicalis* and *Candida parapsilosis* were found resistant to this acid and its derivatives. This furnishes a simple test to differentiate between the aforementioned species of yeasts.

Sterile filter paper discs are soaked with 5 to 7 percent of benzoic acid salt (e.g. sodium benzoate). On a solid medium, a zone of inhibition surrounding the benzoic acid, benzoate or "benzoyl" sensi-disc would indicate selective sensitivity to this compound e.g. *Cryptococcus neoformans* or *Candida albicans*. *Saccharomyces cervicae* is also sensitive in addition to *Hansenula anomala* but these are easily differentiated by the colour reaction on Mycogel (see above).

What is claimed is:

1. A selective and enriched composition for the isolation, identification and propagation of yeasts and fungi in presence of bacteria which comprises an aqueous extract of the pulp of the ripe fruit of the tree *Cassia fistula* that contains 1,8,dihydroxy-anthraquinone-3-carboxylic acid and an anthraquione substance having a melting point of about 250°C. a nitrogen source and sugar.

2. The method of selectively propagating fungi and yeasts in the composition of claim 1 which comprises inoculating the composition with a sample containing bacteria, fungi and yeast and incubating the inoculated composition.

* * * * *